2 Sheets—Sheet 1
W. D. GOODNOW.
Car Brake.
No. 2,696.
Reissued July 23, 1867.
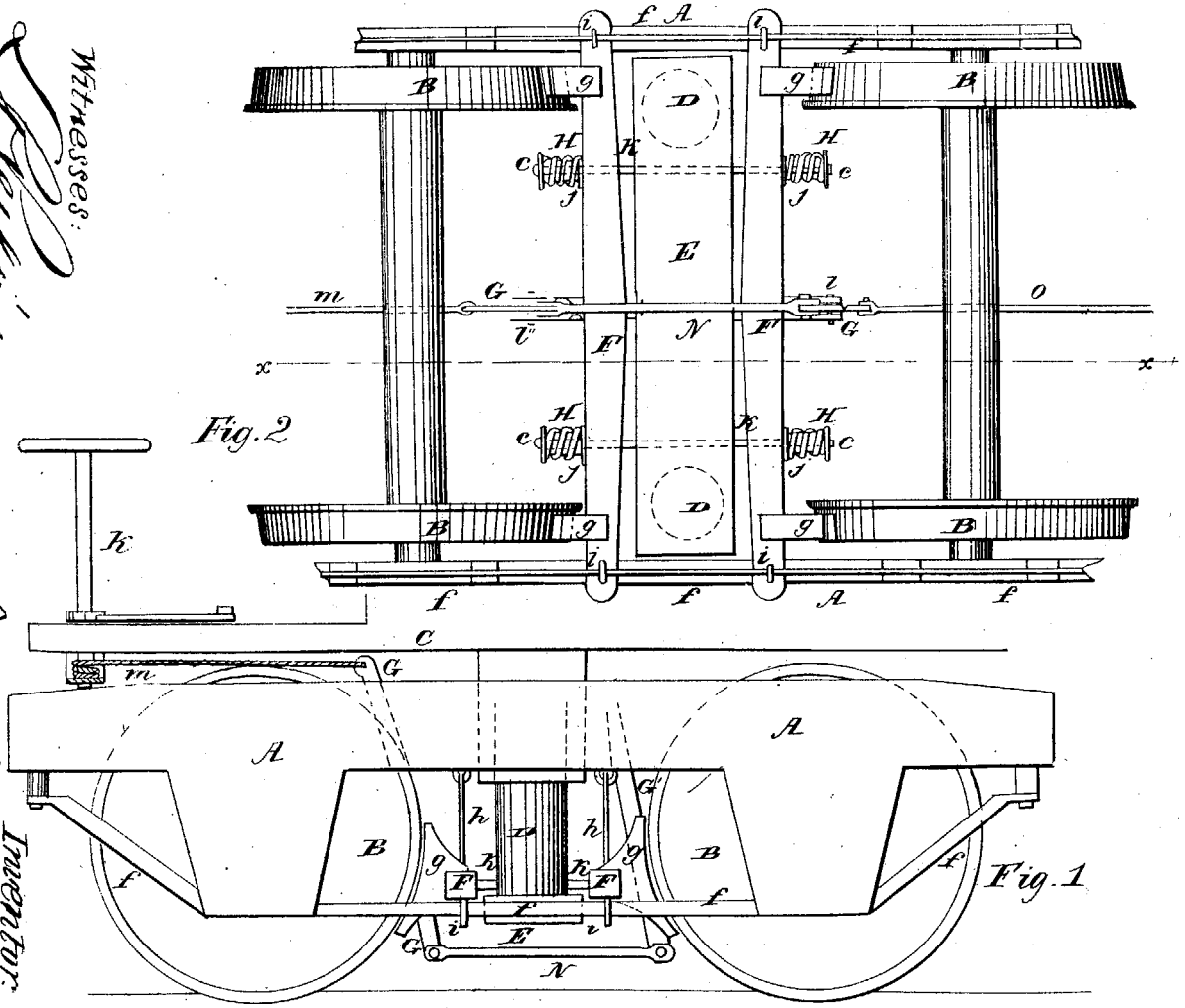
Witnesses:
L. Perkins
J. Brauer
Inventor:
Wm. D. Goodnow
by J. Brauer Res. Atty 2 Sheets—Sheet 2.
W. D. GOODNOW.
Car Brake.
No. 2,696. Reissued July 23, 1867.
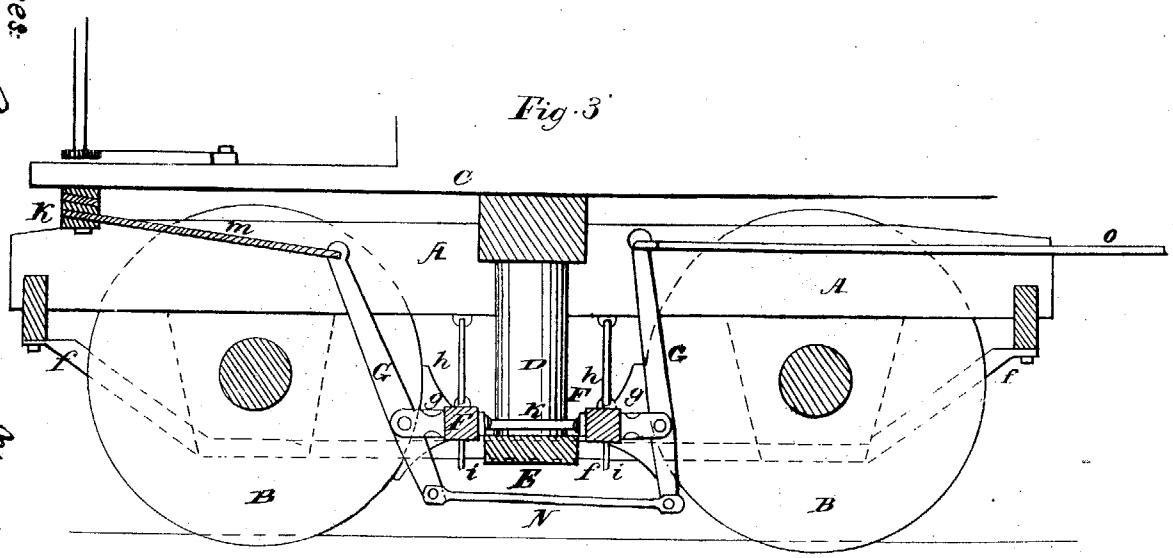
Witnesses:
L. Pelkins
J. Fraser
Inventor:
Wm. D. Goodnow
by J. Fraser Jr. Co. attys.
N. PETERS, PHOTO-LITHOGRAPHER, WASHINGTON, D. C.

United States Patent Office.

JOHN A. GOEWEY AND D. S. WOOD, OF ALBANY, AND JOSEPH JONES, OF WEST ALBANY, NEW YORK, ASSIGNEES OF WILLIAM D. GOODNOW, BY MESNE ASSIGNMENTS.

*Letters Patent No.* 44,718, *dated October* 18, 1864; *reissue No.* 2,696, *dated July* 23, 1867.

IMPROVED CAR-BRAKE.

The Schedule referred to in these Letters Patent and making part of the same.

TO ALL WHOM IT MAY CONCERN:

Be it known that WILLIAM D. GOODNOW, of the city and county of Albany, in the State of New York, did invent a new and useful Improvement in Railroad Car-Brakes; and that the following is a full and exact description of the same, reference being had to the accompanying drawings, making part of this specification, in which—

Figure 1 is a side elevation of a railroad car-truck, having his improved brakes attached.

Figure 2 is an inverted view of the truck, portions of the brake being shown in plan view.

Figure 3 is a vertical section of the truck and brake on the line *x x* of fig. 2.

Like letters of reference designate corresponding parts in all of the figures.

In the ordinary method of constructing railway car-brakes they are applied to the outer side of the four wheels of the truck, thus exposing the bolts, rods, and other parts used in connecting with and for operating them to the liability to breakage and the loss of the screw-nuts, from the excessive jarring and vibration to which they are subject, and thus rendering them liable to fall under the wheels and become the means of throwing the cars from the track. The weight of the car body rests upon the middle of the truck, which is the centre of its motion, and its extremities vibrate more in the ratio of their distance from the centre, so that objects at their ends are subject to constant motion while the train is running, while those in the centre ride comparatively steady.

It is the object of this invention to obviate this cause of accidents by a compact arrangement of the brakes in the centre, between the wheels of the trucks, thereby exposing them to less danger of breaking, or their parts becoming detached, from the cause above mentioned; and the invention further consists in connecting the brake-bars or shoes with the horizontal jaw-braces of the trucks, or other suitable bars attached thereto, which serve as guides on which the brakes slide, and, in case said bars are broken, prevent them from falling to the track and obstructing the wheels; and it further consists in operating the two brakes conjointly, by the direct endwise thrust of a short connecting-bar, by which both are made to act on the wheel simultaneously.

As represented in the drawings, A A are the frame of a four-wheeled truck, B B being the wheels, and C a portion of the car body and platform. The weight of the car body rests on the trucks, through the medium of the springs D D, (either of India rubber, as represented, or of elliptic steel,) which rest on the plank-hanger E, which is firmly attached to the truck-frame by means of iron straps, not shown in the drawings. This plank, as represented, hangs below the axis of the wheel B, in order to afford room for the action of the springs; but this arrangement is not essential, and the plank may be dispensed with by hanging the car body directly to a cross-beam of the truck-frame and placing the springs D, or equivalent springs, in boxes resting on the bearings of the axles of the truck-wheels B, a common mode of construction, and one to which this improvement is equally adapted.

The brake-bars F F, to which are attached the friction-shoes *g g*, are connected at or near the shoes preferably with the horizontal bars *f f*, usually termed jaw-braces, which are firmly bolted at either end to the beam of the truck-frame A, and descend thence to the boxes or castings which receive the axles of the wheels B, and extend between the two on a horizontal line. An independent bar or guide may be used with the same effect, though not so economically. The brake may be connected with these horizontal bars by means of the yoke *i*, embracing the same, or by a socket, eye, or other device, which would be the equivalent thereof, attached to the bar or shoe, the connection being a loose one, or sufficiently so to allow the brakes to move freely along the bars *f f*, as hereafter described. The bars *f f* serve both as a guide to the brake-bars or shoes in their motion to and from the wheels, and also to restrain the shoe or parts attached to it from falling under the wheels in the event of their being detached from the bars, or the bars themselves being broken.

Ordinarily the brakes are held away from the wheels, when not required, by curved leaf-springs connected with the truck-frame, but he employs two spiral or rubber springs H H, shown in fig. 2, on the outer or wheel side of each bar F, to throw the shoes off from the wheel when the levers are not applied. As a further measure of prevention against the brakes falling on the track, he extends bolts or rods *k k* through both bars, making them serve the double purpose of guides for the springs, and means of safety, as will hereafter be described, these rods being preferably of round form, a convenient guide, for the coiled springs, having upon their ends heads or nuts *c*, with suitable packing interposed, and also washers *j*, intervening between the springs and bars, to prevent the wear of the latter. Thus the two bars, being free to move on the rods *k k* and bars *f f*, are forced towards each other by the pressure of the springs, so as to keep the shoes from contact with the wheels. These springs are preferably arranged about equidistant from the middle and ends of the brake-bars, and at the centre of each a coupling-head, *l*, (shown most clearly in fig. 3,) is firmly attached, and pivoted to these are the two levers G G′, by which the brakes are actuated, the former being connected by the chain *m* to the windlass K, which is of ordinary construction, and the latter with the rod *o*, which extends to the brake of the other truck, so that the winding up of the chain on the windlass K applies the brakes to all of the wheels of the car. The short arms of the levers G G′ are connected by a single short bar, N, by which the motion of G is communicated by a direct endwise thrust to G′.

In the ordinary mode of constructing car-brakes the brake-bar is applied to the lower ends of the levers, which are connected by a rod in place of the coupling-heads *l l*. In order to avoid interfering with the hangings of the car body, this connecting-rod has to be bent considerably from a straight direction, and consequently a larger bar than would otherwise be necessary must be used to give sufficient rigidity at the angles; and as the distance of the bars apart is that between the outside of the pairs of truck-wheels, the weight of the rod becomes an objection, and it does not act quickly, because all the slack of the joints, as well as the spring of the bent rod itself, has to be "taken up" before its force acts upon the wheels. His arrangement obviates these objections by making the axis of the brake-levers G G′ in the brake-bars, and connecting their lower ends by a short, straight, and rigid bar, N, by means of which the winding up of the chain *m* on the windlass actuates the brakes by pushing them apart, the rigid bar N being the medium of resistance between the two levers, and furnishing the fulcra from which they actuate the brakes. This mode of applying the power is exceedingly important in its effects, as it greatly simplifies the construction, as well as obviates the liability to accidents, it being hardly possible that the bar N can be broken by the direct endwise pressure or compression to which it is subject. This bar is the only part that can, if broken loose, fall upon the track, and that contingency is rendered extremely unlikely to occur by the advantages of its situation, and by making its connections with the levers strong.

Another advantage of this mode of construction is that the action of both brakes is nearly simultaneous, from being direct and conveyed through so short a medium as the bar N, the situation of which is such as to render any flexibility impossible.

The parts of a brake apparatus most likely to break by use are the bars F F at the centre, where they are connected with the coupling-heads *l*. These bars are also the parts most liable to fall on the track, from a nut jarring off, and releasing them from connection with the truck-frame. The consequence of a portion of one of these bars, with the brake-blocks *g* attached, falling under the wheel is to immediately throw the car from the track. His plan specially provides against these accidents, first, by connecting each end of the bar or the shoe with the horizontal guide-bars or braces *f*, so that if broken in the middle no part can fall under the wheels; but if either part falls it must be midway between the tracks, where its effects would be comparatively harmless; and by the additional guide-rods *k k* passing through both bars, and having a like preventive effect near the middle of the bars. Thus, connected by these means, the bars can never fall to the ground while the car and truck remain together. As an additional precaution, the ordinary suspension-links *h h* would serve to sustain portions of the bars, should they be broken both at the ends and intermediate between the ends and the centre; and further, if the levers G G′ are broken from their connections *m o*, the bars sustain them, even though they are broken from their hangings. The springs H may be applied with the same effect to the guide-bars *f f*, though less conveniently, from the shape and exposed position of the latter.

The described arrangement of springs not only secures the before-mentioned advantages, but reduces the cost materially, by dispensing with the leaf-springs ordinarily used, which are expensive, liable to break, and require a number of bolts to each to attach them, which are liable to be lost from their places, while the spiral springs are not liable to break, require no bolts to fasten them, and are light and cheap. Spiral springs have not before been used on brakes of this class, for the reason that the arrangement of the brake-bars outside of the wheels affords no convenient place to apply them.

The use of the guide-rods and bars for sustaining the brake dispenses with the necessity of the safety-chains heretofore used to prevent the bars from falling on the track if they break, and they are much safer, because chains are exceedingly liable to break from a sudden strain coming upon them if the other parts give way, and are a superfluous weight if their office can be performed in a better manner by some necessary adjunct, as here shown.

The arrangement of the brake-bars F F, levers G G′, and connecting or actuating-bar secures the important advantages of compactness, fewness and simplicity of the parts, and a direct thrust or action between the two levers G G′.

In the old arrangement the levers are actuated by a drawing force directly the opposite to this method, from the fact that the friction-blocks have to be applied by moving them toward the centre of the truck instead of from it. This arrangement insures much greater durability and exemption from accidents, in consequence of the arrangement of the working parts of the brake in the centre of the truck, where it is least subject to vibration, as before described.

What is claimed as the invention of the said GOODNOW, is—

Connecting the brake-bars F F to horizontal guide-bars affixed to the truck, substantially as and for the purposes set forth.

In combination with the horizontal guide-bars *k k*, the spiral springs H, to repel the brakes from the face of the wheels, substantially as set forth.

Also, in combination with the plank or hang-frame E of the car body, and the brake-bars F F, the guide and safety-rods *k k*, arranged and operating substantially as and for the purposes set forth.

Also, the combination of the brake-bars F F, levers G G′, connecting-bar N, springs H H, and chains *m o*, with the truck-wheels B B, arranged and operating substantially in the manner and for the purposes shown and described.

In witness whereof we have hereunto signed our names in the presence of two subscribing witnesses.

JOHN A. GOEWEY,
D. S. WOOD,
JOSEPH JONES.

Witnesses:
J. B. STURTEVANT,
W. C. ALLEN.